United States Patent
Okura et al.

(10) Patent No.: US 10,899,188 B2
(45) Date of Patent: Jan. 26, 2021

(54) COIL SPRING FOR SUSPENSION

(71) Applicant: NHK SPRING CO., LTD., Yokohama (JP)

(72) Inventors: Ken Okura, Yokohama (JP); Shuji Ohmura, Yokohama (JP); Shusaku Hayashi, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 16/799,916

(22) Filed: Feb. 25, 2020

(65) Prior Publication Data

US 2020/0189343 A1 Jun. 18, 2020

Related U.S. Application Data

(60) Division of application No. 15/937,468, filed on Mar. 27, 2018, now abandoned, which is a continuation of (Continued)

(30) Foreign Application Priority Data

Oct. 1, 2015 (JP) ................................. 2015-196036

(51) Int. Cl.
*F16F 1/06* (2006.01)
*B60G 11/16* (2006.01)
(Continued)

(52) U.S. Cl.
CPC ............ *B60G 11/16* (2013.01); *B60G 15/063* (2013.01); *B60G 15/07* (2013.01); *F16F 1/06* (2013.01);
(Continued)

(58) Field of Classification Search
CPC ........ B60G 11/14; B60G 11/16; B60G 15/07; B60G 15/062; B60G 15/063; B60G 2204/124
See application file for complete search history.

(56) References Cited

U.S. PATENT DOCUMENTS 4,778,162 A * 10/1988 Borlinghaus ............ B60G 7/04
267/173
5,092,568 A * 3/1992 Tachikawa .............. F16F 1/122
267/170
(Continued)

FOREIGN PATENT DOCUMENTS

CN 201496455 U 6/2010
DE 3136954 A1 3/1983
(Continued)

OTHER PUBLICATIONS

Machine translation of JP 2014122652 (no date).*
(Continued)

*Primary Examiner* — Nicholas J Lane
(74) *Attorney, Agent, or Firm* — Holtz, Holtz & Volek PC

(57) ABSTRACT

A coil spring includes a wire shaped to be helical, and is compressed between an upper spring seat and a lower spring seat. The coil spring includes an upper portion and a lower portion. A positive pitch winding end portion is formed on the upper portion of the coil spring. A terminal-point-strong-abutting-portion is formed at a distal end of the winding end portion. The terminal-point-strong-abutting-portion is in contact with the upper spring seat at one point at a position deviated to an inner side of a vehicle with respect to a coil central axis. On the lower portion of the coil spring, an end turn portion which contacts the lower spring seat is formed.

3 Claims, 5 Drawing Sheets

Related U.S. Application Data application No. PCT/JP2016/078908, filed on Sep. 29, 2016.

(51) Int. Cl.
*B60G 15/07* (2006.01)
*B60G 15/06* (2006.01)
*F16F 1/12* (2006.01)

(52) U.S. Cl.
CPC .......... *F16F 1/123* (2013.01); *B60G 2202/12* (2013.01); *B60G 2202/312* (2013.01); *B60G 2204/1242* (2013.01); *B60G 2206/426* (2013.01); *B60G 2206/71* (2013.01); *B60G 2206/72* (2013.01); *F16F 1/126* (2013.01); *F16F 2224/0208* (2013.01); *F16F 2230/0005* (2013.01); *F16F 2230/0023* (2013.01)

(56) References Cited

U.S. PATENT DOCUMENTS

| | | | | |
|---|---|---|---|---|
| 5,947,459 | A * | 9/1999 | Ducloux | B60G 15/063 267/221 |
| 6,247,688 | B1 * | 6/2001 | De Fontenay | B60G 15/068 267/220 |
| 6,460,835 | B1 | 10/2002 | Hamano et al. | |
| 6,712,346 | B2 | 3/2004 | Imaizumi | |
| 7,963,510 | B2 | 6/2011 | Umezawa et al. | |
| 8,485,505 | B2 | 7/2013 | Brandt et al. | |
| 9,770,957 | B2 | 9/2017 | Sano et al. | |
| 2001/0035601 | A1 * | 11/2001 | Imaizumi | F16F 1/047 267/286 |
| 2003/0111782 | A1 * | 6/2003 | Miyagawa | B60G 17/021 267/170 |
| 2004/0169322 | A1 * | 9/2004 | Ogura | B60G 15/07 267/180 |
| 2005/0051937 | A1 * | 3/2005 | Umezawa | F16F 1/126 267/179 |
| 2006/0061024 | A1 | 3/2006 | Jung et al. | |
| 2008/0157449 | A1 * | 7/2008 | Brandt | B60G 15/063 267/286 |
| 2008/0224371 | A1 * | 9/2008 | Brand | B60G 15/063 267/221 |
| 2009/0172946 | A1 | 7/2009 | Ogura et al. | |
| 2014/0301691 | A1 | 10/2014 | Brouty et al. | |
| 2014/0306409 | A1 | 10/2014 | Kazmirski et al. | |
| 2014/0341495 | A1 | 11/2014 | Brouty et al. | |
| 2015/0123329 | A1 * | 5/2015 | Toyota | F16F 1/126 267/221 |
| 2015/0343871 | A1 * | 12/2015 | Tange | B60G 11/14 267/286 |
| 2017/0015171 | A1 * | 1/2017 | Enomoto | B60G 11/16 |
| 2017/0050486 | A1 | 2/2017 | Sayama | |

FOREIGN PATENT DOCUMENTS

| | | | |
|---|---|---|---|
| DE | 4110471 | A1 | 10/1991 |
| DE | 102007038072 | A1 | 6/2008 |
| EP | 0728602 | A1 * | 8/1996 ............ B60G 15/07 |
| EP | 728602 | A1 | 8/1996 |
| FR | 2540586 | A1 * | 8/1984 ............... F16F 1/06 |
| FR | 2540586 | B1 | 6/1985 |
| JP | 58032970 | Y2 | 7/1983 |
| JP | 60085003 | A | 5/1985 |
| JP | S6213237 | U | 1/1987 |
| JP | S6271423 | U | 5/1987 |
| JP | 10281197 | A | 10/1998 |
| JP | 2002234324 | A | 8/2002 |
| JP | 3515957 | B2 | 4/2004 |
| JP | 2007333128 | A | 12/2007 |
| JP | 2008241043 | A | 10/2008 |
| JP | 4336203 | B2 | 9/2009 |
| JP | 2012001162 | A | 1/2012 |
| JP | 2013173536 | A | 9/2013 |
| JP | 2014122652 | A * | 7/2014 |
| JP | 2014202360 | A | 10/2014 |
| JP | 2014237431 | A | 12/2014 |
| WO | 2014169095 | A1 | 10/2014 |
| WO | 2014181872 | A1 | 11/2014 |

OTHER PUBLICATIONS

Machine translation of FR 2540586 (no date).*
English language abstract of EP 0 728 602 (no date).*
Chinese Office Action dated Jul. 11, 2019 (and English translation thereof) issued in Chinese Application No. 201680054728.X.
Extended European Search Report (EESR) dated Apr. 5, 2019 issued in European Application No. 16851797.7.
International Search Report (ISR) dated Jan. 10, 2017 issued in International Application No. PCT/JP2016/078908.
Japanese Office Action dated Apr. 2, 2019 (and English translation thereof) issued in counterpart Japanese Application No. 2015-196036.
Japanese Office Action dated Jul. 30, 2019 (and English translation thereof) issued in Japanese Patent Application No. 2015-196036.
Written Opinion dated Jan. 10, 2017 issued in International Application No. PCT/JP2016/078908.

* cited by examiner

COIL SPRING FOR SUSPENSION

CROSS-REFERENCE TO RELATED APPLICATIONS

This application is a Divisional application of U.S. application Ser. No. 15/937,468, filed on Mar. 27, 2018, which is a Continuation Application of PCT Application No. PCT/JP2016/078908, filed Sep. 29, 2016, which is based upon and claims the benefit of priority from prior Japanese Patent Application No. 2015-196036, filed Oct. 1, 2015, the entire contents of all of which are incorporated herein by reference.

BACKGROUND OF THE INVENTION

1. Field of the Invention

The present invention relates to a suspension coil spring used in a suspension mechanism of a vehicle such as a car.

2. Description of the Related Art

The suspension mechanism of a vehicle such as a car comprises, for example, a suspension coil spring (hereinafter simply referred to as a coil spring), an upper spring seat, and a lower spring seat. The upper spring seat is disposed on the upper side of the coil spring. The lower spring seat is disposed on the lower side of the coil spring. The coil spring is compressed between the upper spring seat and the lower spring seat. The coil spring extends and retracts in accordance with the magnitude of a load.

As an example of the suspension mechanism, a McPherson-strut-type suspension mechanism is known. The McPherson-strut-type suspension mechanism includes a coil spring, and a strut (a shock absorber). The coil spring is arranged between the upper spring seat and the lower spring seat. The strut is arranged inside the coil spring. Further, the coil spring extends and retracts in accordance with the magnitude of the load, and the strut also expands and contracts.

In the McPherson-strut-type suspension mechanism, a central axis of the strut is displaced from a line of action of force input, which is obtained by connecting a ground contact point of a tire and a strut upper end, at an angle. Accordingly, it is known that a lateral force (a component of force which bends the strut) affects the strut, and this lateral force increases the sliding resistance of the strut. Patent Literatures 1 to 6 stated below disclose means for reducing the sliding resistance of the strut. In the well-known technology, a force line position of the coil spring is made parallel with the line of action of force input as much as possible, so that a lateral force produced on the strut is reduced. In the specification, the force line position may be referred to as a load axis.

In Patent Literature 1 (JP S58-32970 Y), a diameter of an end turn portion on a lower side of a coil spring is made smaller than a coil diameter of an effective portion, and the effective portion of the coil spring is arranged at a position offset to an outer side of a vehicle relative to a central axis of a strut. However, since the effective portion of the coil spring is offset to the outer side of the vehicle relative to the central axis of the strut, a space needed to arrange a suspension mechanism including the coil spring in a vehicle body becomes large.

In Patent Literature 2 (EP 728602 A1), by bending a wire at places near an upper end and a lower end of a coil spring, projections which contact a lower spring seat and an upper spring seat, respectively, are formed on the end portions of the coil spring. A portion extending from each of the projections to the corresponding end of the wire is treated as a bent portion of a negative pitch (minus pitch). However, a portion from the negative pitch bent portion to a terminal of the wire is a portion which cannot function as a spring. Accordingly, the mass of the coil spring is increased because of the bent portion that is provided.

In Patent Literature 3 (JP 3515957 B), a pitch angle of an effective portion of the coil spring is changed in accordance with the position of turns from an end for each turn of the wire. In this coil spring, by applying a load transversely (i.e., in a radial direction of a coil) in a usage state in which the coil spring is fitted to a suspension mechanism, an initial lateral force and a moment are produced. Further, in this state, by firmly holding both ends of the coil spring to an upper spring seat and a lower spring seat, respectively, the coil spring is compressed while maintaining this state. For this reason, with respect to the coil spring of Patent Literature 3, a preload needs to be applied transversely (the radial direction of the coil) when it is fitted to the suspension mechanism. Consequently, fitting of the coil spring to the suspension mechanism is not easy. Moreover, since an end turn portion which does not function as a spring exists in each of the both ends of the coil spring, the mass of the coil spring is increased by these end turn portions.

In Patent Literature 4 (JP 4336203 B), a plurality of projections are formed on an end turn portion of a coil spring, and the wire is made to contact different projections according to a load applied to the coil spring. For example, in accordance with increase of the load, the projection on the farther side from an end of the wire contacts the spring seat. Accordingly, when a load applied to the coil spring is changed, a position of contact between the end turn portion and the spring seat is changed. Therefore, a force line position (load axis) is also changed.

In a coil spring of Patent Literature 5 (JP 2013-173536 A), the coil spring is arranged offset to an outer side of a vehicle with respect to a central axis of a strut. Accordingly, a space needed for arranging a suspension mechanism including the coil spring in a vehicle body is increased.

In a coil spring of Patent Literature 6 (JP 2014-237431 A), an end turn portion of a negative pitch (a reverse pitch), which does not function as a spring, is provided on each of the upper end and lower end of the coil spring. Accordingly, the mass of the coil spring is increased by the above negative pitch end turn portions.

Depending on a vehicle, there may be a case where the force line position (load axis) of the coil spring is desired to be inclined in an aimed direction with respect to the coil central axis also in a suspension mechanism other than the McPherson-strut-type suspension mechanism.

BRIEF SUMMARY OF THE INVENTION

Accordingly, an object of the present invention is to provide a suspension coil spring whose force line position can be inclined in a desired direction with respect to the coil central axis, and whose weight can be reduced.

One embodiment of the present invention relates to a suspension coil spring which is formed of a helically wound wire, and is compressed between an upper spring seat and a lower spring seat, in which the suspension coil spring includes: a winding end portion of a positive pitch at an upper portion of the wire, and a terminal-point-strong-abutting-portion, which contacts the upper spring seat at one point at a position deviated away from a coil central axis in a radial direction of the coil, at a distal end of the winding end portion. Further, the suspension coil spring includes an end turn portion, which contacts the lower spring seat at a position opposite to the terminal-point-strong-abutting-portion (for example, an outer side of a vehicle), at a lower portion of the wire.

According to this embodiment, it is possible to incline the force line position of the suspension coil spring in a direction desired for the suspension mechanism. For example, in the case of a McPherson-strut-type suspension mechanism, since the force line position of the coil spring can be made parallel with the line of action of load input, a lateral force and a bending moment produced on the strut can be reduced. Also, an end turn portion, which does not function as a spring, can be eliminated in at least one of the upper part and the lower part of the coil spring (i.e., the part provided with the terminal-point-strong-abutting-portion), whereby weight reduction is enabled.

In this embodiment, the terminal-point-strong-abutting-portion may contact the upper spring seat at a position deviated to an inner side of the vehicle with respect to the coil central axis. In order to protect the spring seat, etc., the positive pitch winding end portion may have a pitch angle which allows a region extending to 0.4 turns from a distal end of the wire (the terminal-point-strong-abutting-portion) to contact the upper spring seat in a state in which a load is applied. Also, the terminal-point-strong-abutting-portion may be provided with a protection tip, and the upper spring seat with which the protection tip comes into contact may comprise a receiving portion such as a wear-resistant portion. Further, the embodiment may be structured such that the end turn portion is formed at a position deviated to the outer side of the vehicle, and that the end turn portion has a negative pitch when no compressive load is applied, and is deformed to have a positive pitch by being pressed by the lower spring seat when a load is applied.

In another embodiment, a winding end portion of a positive pitch is provided at a lower portion of the wire, a terminal-point-strong-abutting-portion, which contacts the lower spring seat at one point at a position deviated to the outer side of the vehicle with respect to the coil central axis, is provided at a distal end of the winding end portion, and an end turn portion, which contacts the upper spring seat at a position deviated to the inner side of the vehicle, is provided at the upper portion of the wire.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A suspension coil spring according to a first embodiment will now be described with reference to FIGS. 1 and 2.

Figure 1:
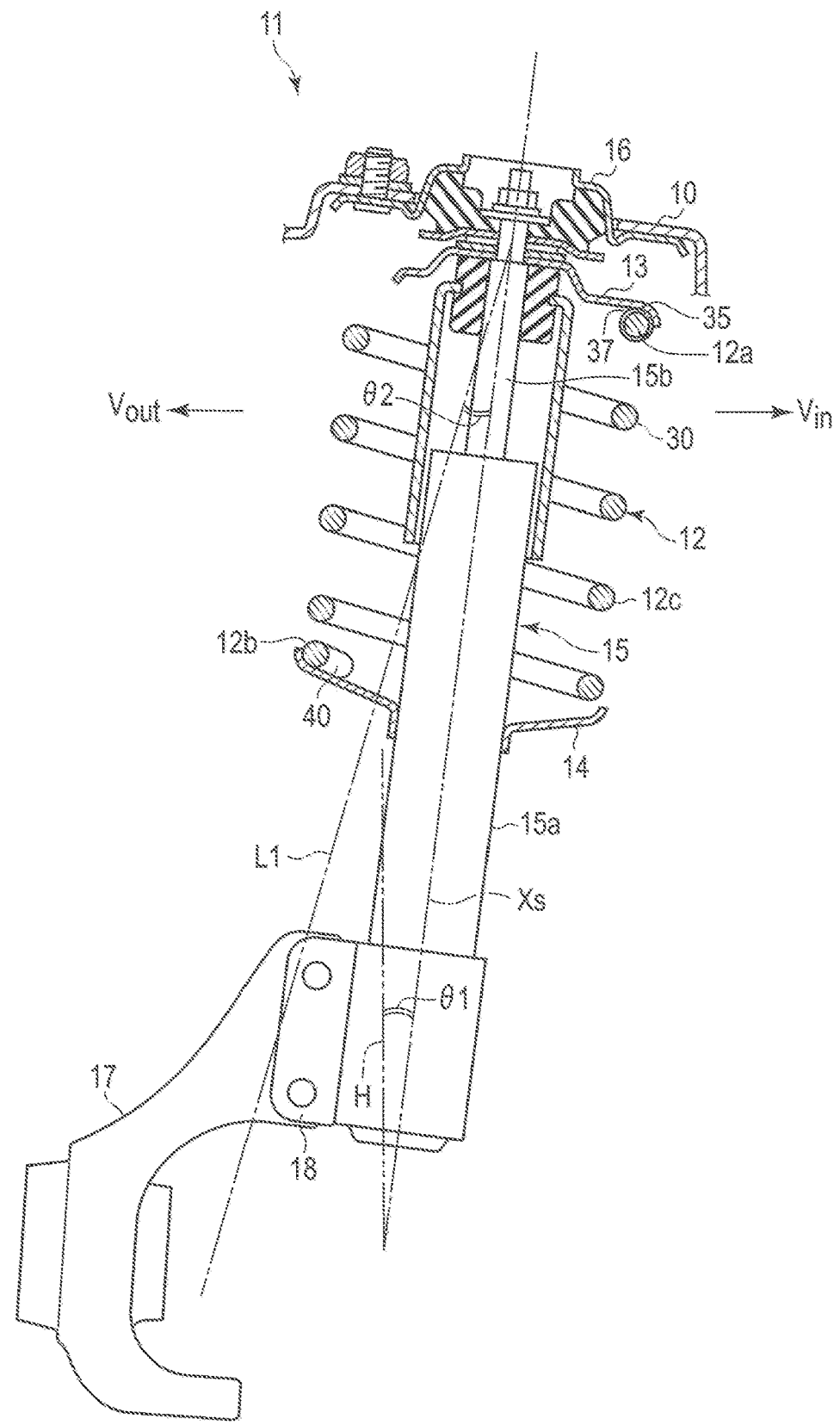
FIG. 1 is a vertical cross-sectional view of a suspension mechanism according to a first embodiment.

FIG. 1 shows a McPherson-strut-type suspension mechanism 11 provided in a vehicle body 10 (partly shown), which is an example of a suspension mechanism for vehicles. The suspension mechanism 11 comprises a coil spring (a compression coil spring) 12, an upper spring seat 13, a lower spring seat 14, a shock absorber 15 which functions as a strut, a mount member 16, a bracket 18, etc. The upper spring seat 13 is disposed on the upper side of the coil spring 12. The lower spring seat 14 is disposed on the lower side of the coil spring 12. An upper end of the shock absorber 15 is mounted on the vehicle body 10 by the mount member 16. A knuckle member 17 is fixed to the bracket 18. The shock absorber 15 includes a cylinder 15$a$ and a rod 15$b$. An axis $X_S$ of the shock absorber 15 is inclined by angle $\theta 1$ with respect to a vertical line H extending vertically.

As shown in FIG. 1, the coil spring 12 is fitted onto the vehicle body 10 in such a state that it is compressed between the upper spring seat 13 and the lower spring seat 14 (i.e., a state in which a preload is applied). The coil spring 12 elastically supports the compressive load applied from above the vehicle 10. The coil spring 12 and the shock absorber 15 are extended and retracted between a full bump (the maximum compression state) and a full rebound (the maximum expansion state) in accordance with the magnitude of the load.

A load applied from above the suspension mechanism 11 is supported by a wheel (a tire) via the knuckle member 17. A line of action of load input L1 forms an angle of $\theta 2$ to a vehicle-outer-side $V_{out}$ with respect to the axis $X_S$ of the shock absorber 15 in light of the relationship with a ground contact point of the tire. A lateral force is produced on the shock absorber 15 by this angle $\theta 2$. Since the lateral force becomes a cause of increasing friction of the shock absorber 15, it is desired to reduce the lateral force.

Figure 2:
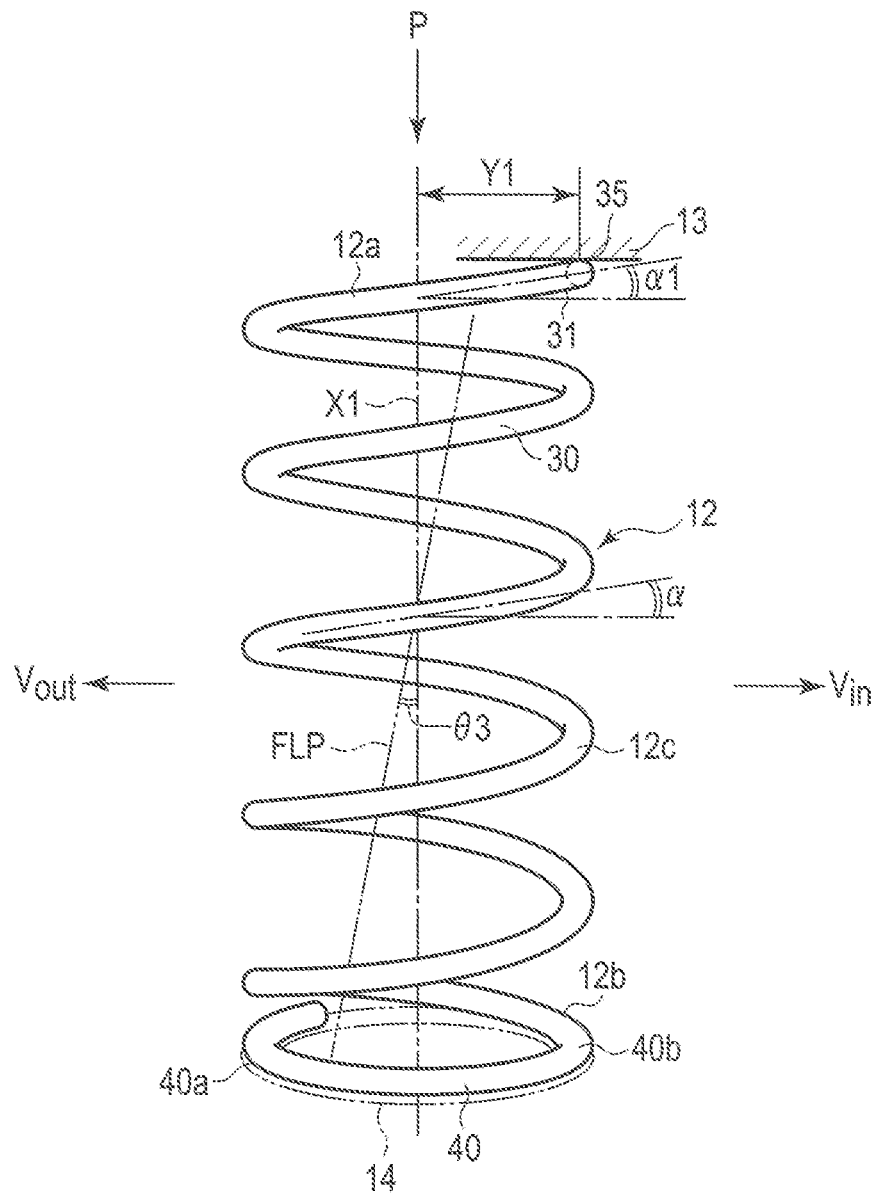
FIG. 2 is a perspective view of a coil spring of the suspension mechanism shown in FIG. 1.

FIG. 2 schematically illustrates the coil spring 12 arranged between the upper spring seat 13 and the lower spring seat 14. The coil spring 12 is mounted on the vehicle body 10 in an assembly state of being compressed between the upper spring seat 13 and the lower spring seat 14. When a compressive load P is applied in a direction along a coil central axis X1, the coil spring 12 is deformed in a direction of making the length of the coil spring 12 shorter than the free length (i.e., the length in a state where no load is applied).

An example of the coil spring 12 is formed of an element (a wire 30) made of spring steel having a circular cross section. The wire 30 is formed in a helical shape. An example of the coil spring 12 is a cylindrical coil spring.

However, depending on the specification of a vehicle, various forms of compression coil springs, such as a barrel-shaped coil spring, an hourglass coil spring, a tapered coil spring, a variable pitch coil spring, and the other shaped springs, can be adopted. A coating film for rust prevention is formed on the entire outer surface of the wire 30.

The wire 30 of the coil spring 12 includes an upper portion 12a and a lower portion 12b. A coil body portion 12c wound helically at a pitch angle α is formed between the upper portion 12a and the lower portion 12b. The pitch angle α may be varied in the direction along the coil central axis X1. Alternatively, the pitch angle α may be substantially constant in the direction along the coil central axis X1. The coil central axis X1 passes through substantially the center of the coil body portion 12c.

At the upper portion 12a of the coil spring 12, a winding end portion 31 of a positive pitch (i.e., a positive pitch angle α1 as shown in FIG. 2) is formed. A terminal-point-strong-abutting-portion 35 is formed at a distal end (an upper end) of the winding end portion 31. The terminal-point-strong-abutting-portion 35 contacts the upper spring seat 13 at one point. In other words, the terminal-point-strong-abutting-portion 35 is in contact with the upper spring seat 13 at a position deviated away from the coil central axis X1 in a radial direction of the coil, more specifically, to a vehicle-inner-side $V_{in}$, by a distance Y1. At a contact portion of the upper spring seat 13 and the terminal-point-strong-abutting-portion 35, a wear-resistant force transmission portion 37 (FIG. 1) should preferably be provided.

An end turn portion 40 is formed at the lower portion 12b of the coil spring 12. The number of turns of the end turn portion 40 is, for example, 0.5 or so. The end turn portion 40 is in contact with the lower spring seat 14 at a position deviated to the vehicle-outer-side $V_{out}$ with respect to the coil central axis X1. More specifically, the end turn portion 40 includes a first portion 40a and a second portion 40b. The first portion 40a is always in contact with the spring seat 14 irrespective of the magnitude of the load P. Thus, the first portion 40a is a portion (non-effective portion) which does not function as a spring. The second portion 40b is separated from the spring seat 14 when the load P is small, and contacts the spring seat 14 when it is large.

The coil spring 12 of the present embodiment is compressed between the terminal-point-strong-abutting-portion 35 and the end turn portion 40. The terminal-point-strong-abutting-portion 35 contacts the upper spring seat 13 at a position deviated to the vehicle-inner-side $V_{in}$. The end turn portion 40 contacts the lower spring seat 14 at a position deviated to the vehicle-outer-side $V_{out}$. Consequently, a force line position FLP is inclined in a direction along the line of action of force input L1 (FIG. 1) at an angle of θ3 (FIG. 2) with respect to the coil central axis X1. The force line position FLP is a center line of a repulsive load of the coil spring 12. Since the force line position FLP is inclined in the direction along the line of action of force input L1, a component of force directed to the vehicle-outer-side $V_{out}$ is produced at an upper end of the coil spring 12. The component of force is effective in canceling a bending moment which is produced on the shock absorber 15.

Moreover, in the coil spring 12 of the present embodiment, the upper portion 12a contacts the upper spring seat 13 via the terminal-point-strong-abutting-portion 35. For this reason, an end turn portion (i.e., a portion which does not function as a spring) is not required in the upper portion 12a of the coil spring 12. More specifically, with respect to the coil spring 12 of the present embodiment, almost the entire length of the coil spring 12 excluding the lower end turn portion 40 can be used as an effective portion of the spring. Thus, the mass can be reduced as compared to a conventional spring having an end turn portion on each of an upper end and a lower end. Note that when the compressive load P is increased, the wire can be brought into intimate contact for a certain length from the terminal-point-strong-abutting-portion 35. Also in this case, a load is substantially concentrated on the terminal-point-strong-abutting-portion 35.

The winding end portion 31 of the positive pitch may have its pitch angle in the free state determined so that the spring seat 13, etc., can be protected in a state where a compressive load is applied to the coil spring 12. The pitch angle of the winding end portion 31 may be determined such that a region extending to 0.4 turns from the terminal-point-strong-abutting-portion 35 at a distal end of the wire 30, for example, contacts the spring seat 13.

Figure 3:
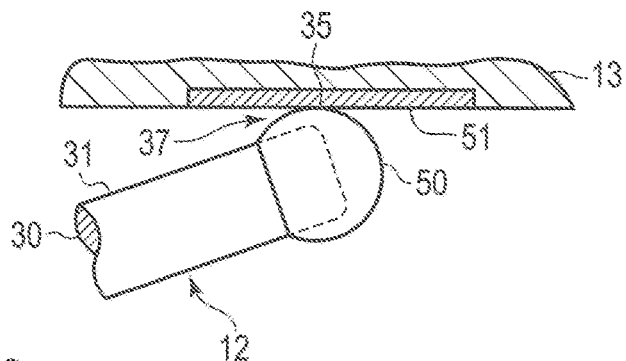
FIG. 3 is a side view showing a terminal-point-strong-abutting-portion of a coil spring according to a second embodiment.

FIG. 3 shows a part of a coil spring 12 according to a second embodiment. A terminal-point-strong-abutting-portion 35 is formed at a distal end of the coil spring 12. A protection tip 50 as an example of a force transmission portion 37 is provided at the terminal-point-strong-abutting-portion 35. An example of the protection tip 50 is a wear-resistant tip formed of a material whose hardness is greater than that of a wire 30, and which is hard to wear (for example, cemented carbide, high-speed steel, or titanium alloy). This wear-resistant tip is arranged on a distal end of the wire 30. Alternatively, an elastomer such as urethane, rubber, or a polymeric material (resin) may be used for the material of the protection tip 50.

On a surface of a spring seat 13 where the protection tip 50 contacts, a receiving portion 51 for a wear-resistant member, etc., is formed. The receiving portion 51 may include a solid lubricant such as graphite. Since the other structures and functions have commonalities with those of the coil spring 12 of the first embodiment (FIGS. 1 and 2), common reference numbers are assigned to parts in common with the first embodiment, and explanation of such parts is omitted.

Figure 4:
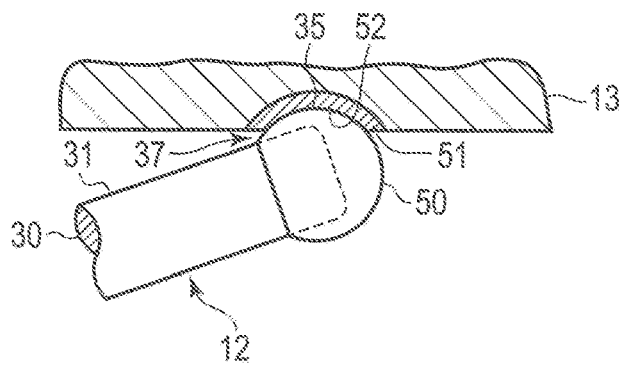
FIG. 4 is a side view showing a terminal-point-strong-abutting-portion of a coil spring according to a third embodiment.

FIG. 4 shows a part of a coil spring 12 according to a third embodiment. A terminal-point-strong-abutting-portion 35 is formed at a distal end of the coil spring 12. A protection tip 50 is provided at the terminal-point-strong-abutting-portion 35. On a surface of a spring seat 13 where the protection tip 50 contacts, a receiving portion 51 for a wear-resistant member, etc., is provided. A recess 52 into which a spherical portion of the protection tip 50 is rotatably fitted may be formed on the receiving portion 51. Since the other structures and functions have commonalities with those of the coil spring 12 of the second embodiment, common reference numbers are assigned to parts in common with the second embodiment, and explanation of such parts is omitted.

Figure 5:
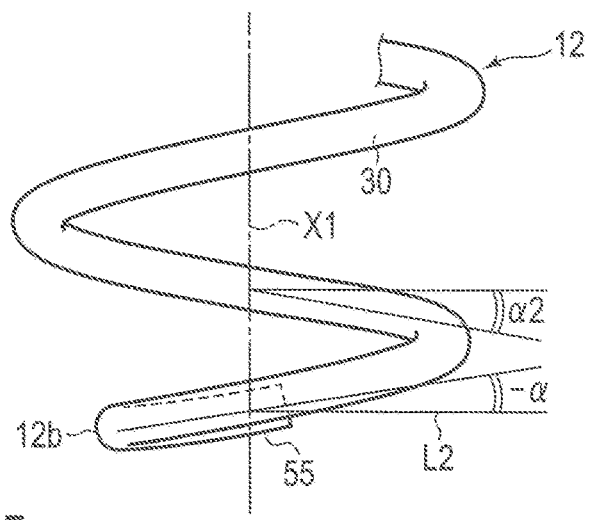
FIG. 5 is a side view showing a lower part of a coil spring according to a fourth embodiment.
Figure 6:
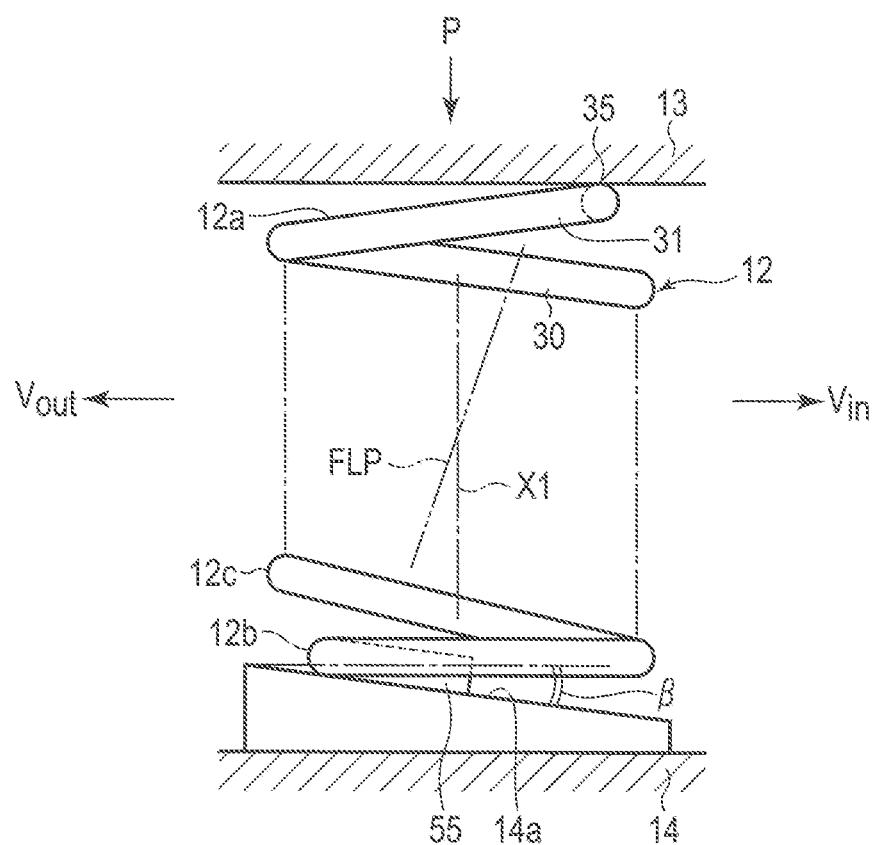
FIG. 6 is a side view schematically showing a state in which the coil spring shown in FIG. 5 is compressed between an upper spring seat and a lower spring seat.

FIG. 5 is a side view showing a part of a coil spring 12 according to a fourth embodiment. FIG. 6 is a side view schematically showing a state in which the coil spring 12 shown in FIG. 5 is compressed between an upper spring seat 13 and a lower spring seat 14. A terminal-point-strong-abutting-portion 35 is provided at an upper end of the coil spring 12. The terminal-point-strong-abutting-portion 35 contacts the upper spring seat 13 at one point at a position deviated to a vehicle-inner-side $V_{in}$ with respect to a coil central axis X1.

As shown in FIG. 5, an end turn portion 55 is formed at the lower part of the coil spring 12. The end turn portion 55 has a negative pitch in the free state in which no load is applied. The end turn portion 55 of the negative pitch forms a negative angle (−α) with respect to a line segment L2 orthogonal to the coil central axis X1. A portion excluding the end turn portion 55 has a positive pitch of pitch angle α2. The end turn portion 55 on the lower side is supported at a position deviated to a vehicle-outer-side $V_{out}$ with respect to the coil central axis X1 by a supporting surface 14a of the lower spring seat 14, as shown in FIG. 6. The supporting surface 14a of the lower spring seat 14 forms a positive inclination angle β. When the coil spring 12 is compressed between the spring seats 13 and 14 by a load P, the end turn portion 55 is elastically deformed in the positive pitch at a glance, in accordance with the inclination angle β of the supporting surface 14a. Also with the coil spring 12 as described above, a force line position (a load axis) FLP can be inclined in a direction along a line of action of force input.

Figure 7:
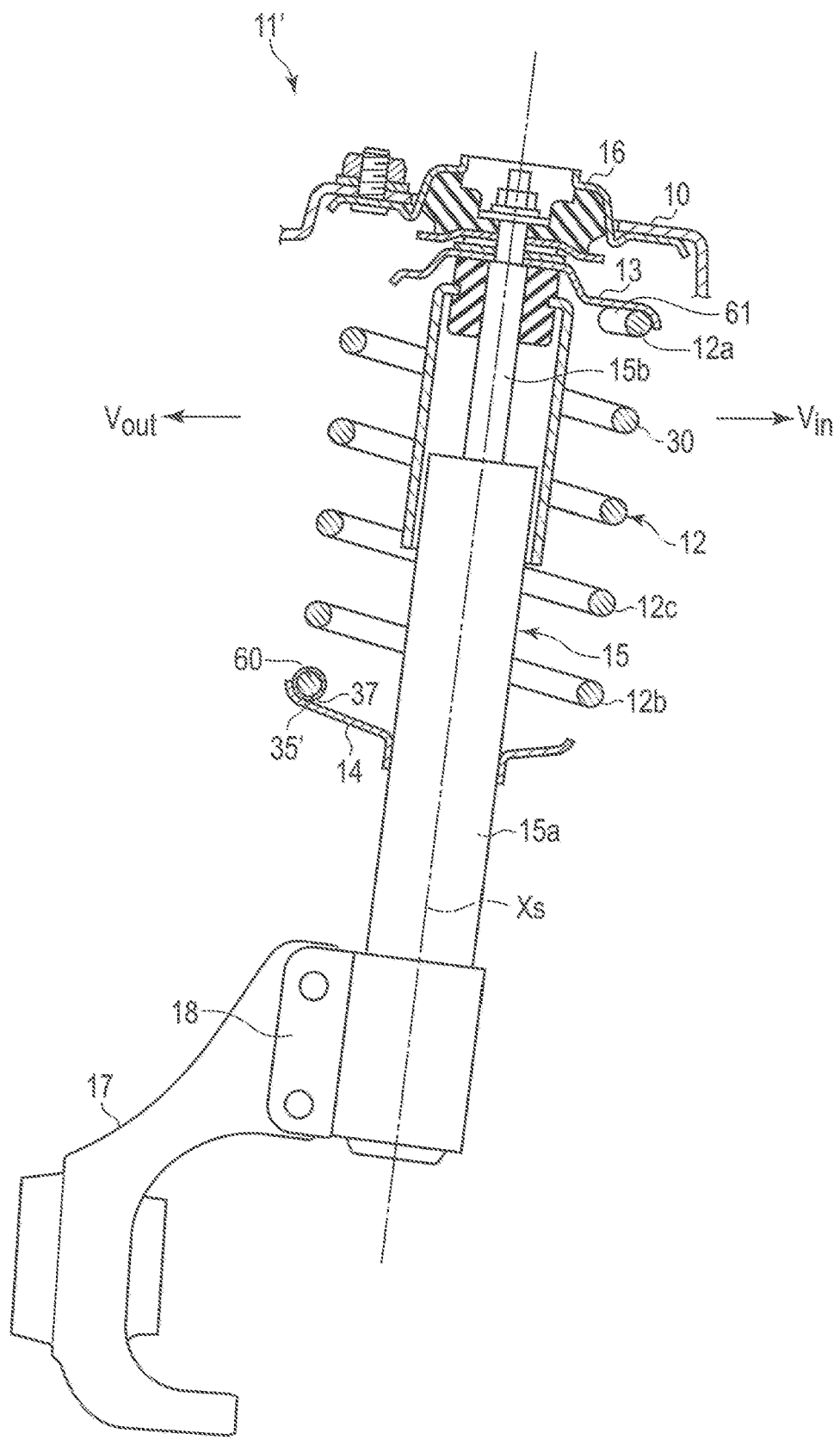
FIG. 7 is a vertical cross-sectional view of a suspension mechanism according to a fifth embodiment.

FIG. 7 shows a suspension mechanism 11' according to a fifth embodiment. At a distal end of a winding end portion 60 on the lower part of a coil spring 12, a terminal-point-strong-abutting-portion 35' is formed. The terminal-point-strong-abutting-portion 35' is in contact with a lower spring seat 14 at a position deviated to a vehicle-outer-side $V_{out}$ with respect to a coil central axis. An end turn portion 61 formed at the upper part of the coil spring 12 is in contact with an upper spring seat 13 at a position deviated to a vehicle-inner-side $V_{in}$ with respect to the coil central axis. When the distal end of the lower winding end portion 60 is directed toward the outer side of the vehicle as in this embodiment, by forming the terminal-point-strong-abutting-portion 35' on the distal end of the winding end portion 60, a force line position (a load axis) can be inclined in a desired direction.

The winding end portion 60 of a positive pitch may have its pitch angle in the free state determined so that the spring seat 14, etc., can be protected in a state where a compressive load is applied to the coil spring 12. The pitch angle of the winding end portion 60 may be determined such that a region extending to 0.4 turns from the terminal-point-strong-abutting-portion 35' at a lower end of a wire 30, for example, contacts the spring seat 14. A protection tip 50 and a receiving portion 51 shown in FIG. 3 or FIG. 4 may be provided at the terminal-point-strong-abutting-portion 35'.

According to the suspension mechanism 11' shown in FIG. 7, the lower part of the coil spring 12 is supported by the lower spring seat 14 via the terminal-point-strong-abutting-portion 35'. Accordingly, there is no need to provide an end turn portion on the lower part of the coil spring 12. According to this structure, it is possible to avoid the risk of the coil spring being damaged by hard foreign substances such as sand being trapped between the lower spring seat and the end turn portion. Since the other structures and functions have commonalities with those of the suspension mechanism 11 of the first embodiment (FIGS. 1 and 2), common reference numbers are assigned to parts in common with the first embodiment, and explanation of such parts is omitted.

Depending on the specification of a suspension, a lateral force may be produced when the force line position (load axis) of the coil spring is inclined in a longitudinal direction of the vehicle. When this lateral force affects the vehicle performance, the lateral force may be canceled by arranging the terminal-point-strong-abutting-portion such that the force line position comes to a neutral position in the longitudinal direction.

Needless to say, in carrying out the present invention, not only the specific shape and arrangement of the coil spring, but also the position and shape of the terminal-point-strong-abutting-portion, and the shape, arrangement, etc., of the upper spring seat and the lower spring seat which constitute the suspension system may be modified variously. The present invention can be applied to a suspension mechanism of a vehicle other than cars. Also, the present invention can be applied to a coil spring of a suspension system other than the McPherson-strut-type suspension.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension coil spring which is formed of a helically wound wire, and which is compressed by a compressive load between an upper spring seat and a lower spring seat, the suspension coil spring comprising:

a winding end portion of a positive pitch provided at an upper portion of the wire;

a terminal-point-strong-abutting-portion provided at a distal end of the winding end portion, the terminal-point-strong-abutting-portion contacting the upper spring seat at one point at a position deviated to an inner side of a vehicle with respect to a coil central axis; and an end turn portion provided at a lower portion of the wire, the end turn portion comprising:

a first portion which is a non-effective turn portion, has a predetermined length from a lower end of the wire, is arranged at a position deviated to an outer side of the vehicle opposite to a side that the terminal-point-strong-abutting-portion is provided, and is always in contact with the lower spring seat irrespective of magnitude of the compressive load; and a second portion which is separated from the lower spring seat when the compressive load is small, and contacts the lower spring seat when the compressive load is large, wherein a force line position of the coil spring which is a center line of a repulsive load of the coil spring is inclined in a direction along a line of action of force input of the compressive load at an angle with respect to the coil central axis in a state where the coil spring is compressed by the compressive load.

2. The suspension coil spring of claim 1, wherein the winding end portion has a pitch angle which allows a region extending to 0.4 turns from a distal end of the wire to contact the upper spring seat in a state where a load is applied.

3. The suspension coil spring of claim 1, further comprising a protection tip provided on the terminal-point-strong-abutting-portion, wherein the protection tip comes into contact with the upper spring seat, and the upper spring seat comprises a receiving portion.

* * * * *